United States Patent Office 3,502,624
Patented Mar. 24, 1970

3,502,624
PREPARATION OF DIAMINE-DICARBOXYLIC ACID SALTS FOR POLYCARBONAMIDES
Carl Bruno Flack, Woodbury, and Robert Howard Weir, Pittman, N.J., assignors to E. I. du Pont de Nemours and Company, Wilmington, Del., a corporation of Delaware
Filed Apr. 4, 1966, Ser. No. 539,983
Int. Cl. C09k 3/00; C08g 20/20
U.S. Cl. 260—78      3 Claims

ABSTRACT OF THE DISCLOSURE

Concentrated aqueous solution of certain diamine-dicarboxylic acid salts for use in the preparation of polycarbonamides.

DETAILED DESCRIPTION OF THE INVENTION

Figure 1:
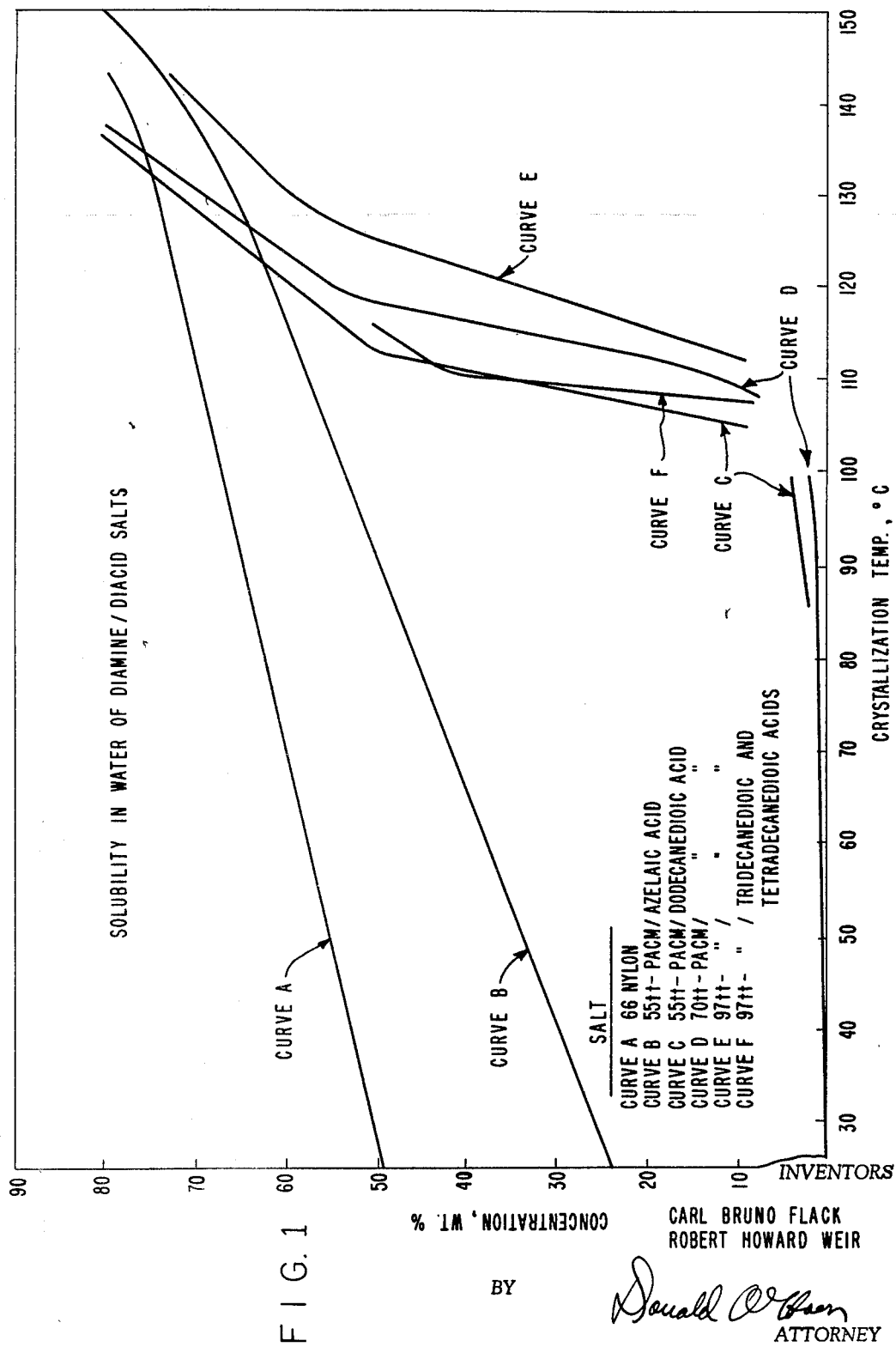

This invention relates to homogeneous solutions of certain diamine-dicarboxylic acid salts for use in the preparation of polycarbonamides. More particularly, it relates to a solution of a salt of a $C_{12}$ to $C_{14}$ alkanedioic acid with bis (4-aminocyclohexyl)methane (the diamine hereinafter being referred to as "PACM").

In the preparation of polycarbonamides such as nylon 66 it has been customary to first produce a concentrated, aqueous solution of the diammonium salt of the diamine and the dicarboxylic acid and then to polymerize the salt by heating the solution as water is removed. The aqueous solvent offers convenience in handling the salt and in addition serves as a heat transfer agent during the polymerization. The relatively high degree of solubility of most such salts in water, even at room temperature, is of advantage for still another important reason; that is, it enables rapid and accurate determination of the diamine/acid balance by a simple pH measurement. Thus in a continuous operation the balance can be suitably adjusted to a predetermined level by addition of either diamine or acid just prior to polymerization so as to ensure production of a uniform quality product.

The foregoing technique has been found to be inapplicable, however, to the production of polycarbonamides from PACM and $C_{12}$ to $C_{14}$ alkanedioic acids because of the very low solubility in water of the corresponding diammonium salts. In the case of these polymers, it has thus been the practice to produce an insoluble salt in an alcohol or other organic-based medium, to filter and dry the solids, and then to transfer the solids to an autoclave for polymerization. While the solids could also be handled in the form of an aqueous slurry, the advantages of a true aqueous solution are not realized, in particular, periodic fluctuations in concentration and in diamine/acid balance tend to occur leading to a nonuniform polymeric product. In the case of a textile filament, for example, this may be deleteriously reflected in such properties as molecular weight and the uniformity of dye-receptivity.

It is a finding of this invention that under particular conditions a homogeneous, concentrated aqueous solution can be obtained of the diammonium salt of PACM, at least 50% of which is the trans-trans isomer, and a $C_{12}$ to $C_{14}$ alkanedioic acid, i.e., a dicarboxylic acid of the formula

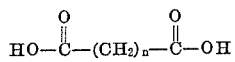

wherein $n$ is an integer of 10 to 12. By virtue thereof, it is possible to achieve fully the benefits of an aqueous-based system in a polymerization process.

In accordance with this invention it has been discovered, quite unexpectedly, that the aforementioned PACM salts, while virtually insoluble at temperatures even up to reflux temperature, dissolve readily in water at temperatures of 110° C. to 160° C. and at pressures which are at least autogeneous. Salt formation is thus effected under these elevated temperature and pressure conditions to produce a homogeneous solution containing at least 20% by weight of the PACM salt. In addition to the economic advantages of this method as compared to one in which the salt is formed as a precipitate and is thereafter charged as such or as a slurry to a polymerization autoclave, other advantages are also afforded. Of considerable importance is the fact that accurate adjustments can readily be made of the PACM/acid balance in the solution to maintain a uniform, high quality product. Similarly the solutions, unlike slurries, permit the use of standard purification techniques, e.g., filtering. Salt solutions are also more suitably adapted for transferring from one vessel to another without encountering variations in composition. In this respect the solution technique also obviates another problem that occurs when PACM salts must be first formed as a precipitate. In particular, the salt of the PACM trans-trans isomer is less soluble than the other two isomers—hence a precipitate formed upon cooling may be comprised of a different isomer content from that of the salt solution resulting in an unexpected change in polymer composition.

Figure 2:
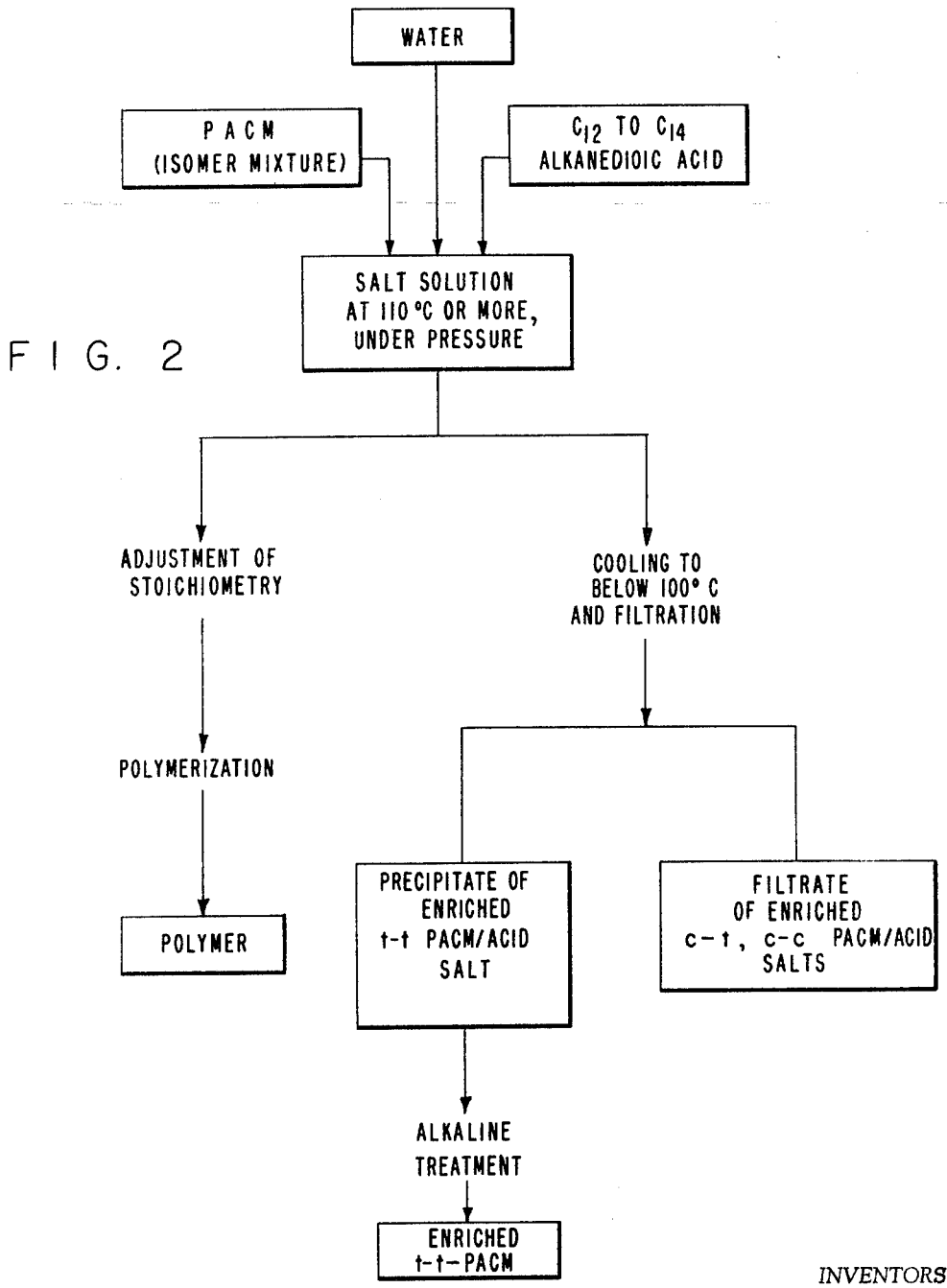

The drawings illustrate as FIGURE 1 and FIGURE 2, respectively, a chart showing certain salt-solubility curves and a flow diagram showing various process embodiments.

The unique and unexpected finding of the invention will be best understood by reference to FIGURE 1 which is a plot of maximum solubility vs. temperature for various diamine/diacid salts in water. Curve A shows the behavior of hexamethylene diammonium adipate, commonly referred to as 66 nylon salt. Curve B shows the behavior of the PACM salt containing 55% by weight of the trans-trans isomer with azelaic acid. These two curves show the usual behavior expected for the effect of temperature upon salt solubility, i.e., high solubility at low temperatures and a gradual increase as the temperature is raised. In marked contrast thereto, curves C, D, and E show the behavior of PACM containing 55% trans-trans, 70% trans-trans and 97% of the trans-trans isomer, respectively, with dodecanedioic acid. Similarly curve F shows the behavior of salts of PACM containing 97% of the trans-trans isomer with either tridecanedioic acid or tetradecanedioic acids, i.e., the curve being essentially the same for both salts.

FIGURE 1 shows the highly unexpected increase in solubility for the subject PACM salts under the conditions of this invention. The solutions above 100° C. are under autogeneous pressure. If ambient atmospheric pressure is maintained, only extremely dilute solutions are obtained before boiling occurs, with no indication that highly concentrated solutions will result with only a 10–20° C. increase under pressure. It is to be noted that temperatures of up to 160° C. or so are sufficiently low that salt decomposition and prepolymer formation ordinarily will not occur at a sufficient rate to interfere with handling of the salt solution in the processes of this invention.

The preparation of homogeneous salt solutions in accordance with the invention involves providing under elevated temperature and pressure conditions a composition of water and an essentially equimolar mixture of at least one organic diamine and at least one dicarboxylic acid, 90% to 100% by weight of said diamine being bis(4-aminocyclohexyl)methane with at least 50% by weight thereof being the trans-trans isomer, and 90% to 100% by weight of said acid being an aliphatic dicarboxylic acid of the formula

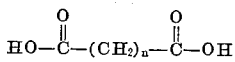

wherein $n$ is an integer of 10 to 12, inclusive, the weight of said mixture being at least about 20% by weight of the total composition, said temperature being about 110° C. to about 160° C., and said pressure being superatmospheric and at least autogeneous pressure, and thereby forming a homogeneous, aqueous solution of the corresponding diammonium salt.

FIGURE 2 illustrates in the form of a flow diagram various embodiments of the process of the invention. Specific features of these process embodiments including a description of the components employed will now be given in greater detail.

PACM is ordinarily obtained by hydrogenation of the aromatic precursor, e.g., see U.S. Patent 2,494,563, and this will generally yield a mixture of about 52% trans-trans, 9% cis-cis, and 39% cis-trans isomers. In some cases a percentage or two of an o,p'-isomer, i.e., 2,4'-(diaminodicyclohexyl)methane, may also be present. Salts of a $C_{12}$ to $C_{14}$ alkanedioic acid with an isomeric mixture, i.e., where the trans-trans isomer content is at least 50%, have an especially low water solubility at temperatures below 100° C. and hence the present invention is particularly applicable thereto. If the trans-trans isomer content is appreciably lower than 50% the full advantages of the invention are not realized. Advantageously, the trans-trans isomer content will be as high as possible, at least 55% and preferably at least 70%, since polycarbonamide fibers formed thereof will exhibit certain desired characteristics such as improved tensile and recovery properties, increased heat stability, and reduced shrinkage.

The invention contemplates the formation of salts containing minor amounts, i.e., up to 10% by weight, of omega-aminocarboxylic acids or lactams thereof. Similarly, such minor amounts of diamines other than PACM and dicarboxylic acids other than $C_{12}$ to $C_{14}$ alkanedioic acids may also be used. Such other materials can be appropriately selected to impart special qualities to the resultant polycarbonamide, which then will be a copolymer. Obviously the invention will have little applicability if the amounts of such other materials are so excessive as to appreciably affect the water solubility of the PACM salt. Other diamines that can be used for obtaining copolymer-forming salts are the alpha-omega aliphatic diamines of two to fourteen carbon atoms, such as hexamethylene diamine, 2-methyl-hexamethylene diamine, and tetramethylhexamethylene diamine. Ring-containing diamines include piperazine, substituted piperazines such as dimethyl piperazine; meta- or para-xylylene diamine; 4,6-dimethyl-xylylenediamine; and 2,2-bis(4-aminocyclohexyl)propane. Suitable diacids include alpha-omega aliphatic acids of 2 to 14 carbon atoms; aromatic acids such as terephthalic acid, isophthalic acid, paraphenylenediacetic acid, bibenzoic acid, 2-methyl terephthalic acid; and 1,4-cyclohexane dicarboxylic acid. Suitable omega-amino carboxylic acids and lactams include epsilon-aminocaproic acid, epsilon-caprolactam, and omega-aminoundecanoic acid.

For the most part it is preferred that the homogeneous salt solutions contain, as the sole polymer-forming ingredients, the $C_{12}$ to $C_{14}$ alkanedioic acid and the bis(4-aminocyclohexyl)methane. These, then lead to polymers which in general exhibit the most favorable properties. Dodecanedioic acid, in any case, is the preferred acid. It will be understood that the term "sole polymer-forming ingredient" as used in connection with the PACM isomers is not intended to exclude small amounts of o,p'-isomers, as above-mentioned, since these will exhibit little or no effect upon either the processes or the products of the invention.

The advantages of producing an aqueous solution of a polycarbonamide-forming diammonium salt have been given above. These advantages as they affect the utilization of such salt solutions in the formation of polycarbonamides are also given in detail in U.S. Patent 2,163,584. While it is preferred for the present invention that the aqueous medium consist essentially of water, it is nevertheless to be understood that the use of minor amounts, i.e., up to 10% by weight, of other liquids is also contemplated. For example, it may be convenient to charge to the salt-forming reaction vessel either the diamine or the dicarboxylic acid or both in the form of a solution in another solvent. Methanol and ethanol are typical of other solvents that might be used for this purpose. As a practical matter, any advantage that might tend to accrue by using other solvents in this way will ordinarily be offset by factors of added expense, e.g., of ultimately having to separate and recycle the two liquids. For this reason, it is highly preferred that water is essentially the sole solvent used in the salt-forming process.

The manner in which water, diamine and dicarboxylic acid are charged to the salt forming reactor is not critical, provided that the quantities are such as to produce a salt solution having a concentration of at least 20% by weight. Usually a 30 to 70% concentration is preferred for maximum process efficiency.

A preferred technique for conducting the salt-forming process of this invention is to add the dry acid to deionized water in a closed heated reactor which is then purged with stem or nitrogen to remove oxygen, heated to a temperature in excess of the salt crystallization temperature at the concentration used, and molten diamine fed into the heated, pressurized vessel. The solution agitated and once formation of the salt solution is complete, the solution can be analyzed for balance of reactants. The salt solution then can be adjusted to a predetermined level by further addition of molten diamine or slurry of the diacid/water.

In any case, the diamine and dicarboxylic acid will usually be first charged to the vessel in amounts which are approximately equimolar, i.e., perhaps using as much as 2 mole percent excess of one over the other. As is well recognized in the art, exact equivalency is not essential. For example, viscosity stabilized polymers can be obtained by using a slight excess of one component. Also, dying properties of the final polymer can be varied depending on the ratio of amine to carboxyl end groups in the final polymer. In some cases it is desirable to use a slight excess of one component to correct for that amount which may be lost through volatilixation during the subsequent polymerization process.

The aqueous mixture of diamine and dicarboxylic acid should attain in the reactor a temperature of 110° C. to 160° C. and a superatmospheric pressure which is at least autogeneous for that temperature. A marked reduction in solubility occurs at temperatures much below 110° C., while above 160° C. there will be a greater tendency for undesired prepolymer to be formed. Temperatures of 120° C. to 150° C. and pressures of 10 to 50 p.s.i.g. are ordinarily most advantageous. While occasionally a salt may have a crystallization temperature slightly below 110° C., it will be understood that for practical purposes a heating temperature of at least 110° C. will be most useful. Preferably the solution is prepared and maintained under a gauge pressure of 10 to 75 p.s.i. The particular conditions employed will, of course, vary upon the concentration of the solution and upon the PACM isomer composition. If a lower than autogeneous pressure is permitted to occur, water is lost as steam and crystallization or precipitation of some of the salt occurs resulting in a nonhomogeneous system and a shift in isomer composition of the solution.

The reactor may be an ordinary autoclave or other suitable high pressure vessel. While superautogeneous pressures can be created in the vessel by pressurizing with an inert gas such as nitrogen, this generally offers no particular benefit. When one or possibly both of the components is charged in molten form, the amount of external heat required to bring the vessel contents up to a suitable temperature can be reduced. Salt formation will occur readily at the elevated temperature thus producing a homogeneous solution. Once the salt solution is prepared and balanced, it may then be held in storage under temperature and pressure to avoid precipitation.

In a preferred embodiment of the invention, the homogeneous salt solution will be formed and stored until ready for polymerization, usually within 48 hours. Ordinarily it will therefore be desirable to transfer the solution while still under elevated temperature and pressure conditions, e.g., by the sue of pressurized transfer lines. Prior to polymerization, however, the salt can be subjected to common treatments such as filtration to remove suspended matter, and adjustment of the diamine/dicarboxylic acid balance. As indicated hereinbefore, such treatments would not be possible for use of the salt in slurry form. Frequently it will be desirable to further concentrate the solution prior to polymerization.

The adjustment of the diamine/dicarboxylic acid balance is a particularly important consideration for a reproducible commercial process. As above discussed, exact stoichiometry is unnecessary but a uniform product will not be obtained unless a predetermined level of stoichiometry is maintained. A convenient method for ascertaining diamine/dicarboxylic balance involves electrometric pH analysis of the salt in a suitable solvent. Thus pH can be related to the salt composition by reference to a predetermined relationship as shown by a titration curve plotting pH versus addition of one salt component to the other. Methods involving such techniques are described in U.S. Patents 2,163,584 and 2,840,547. Owing to the water insolubility of the salts of the present invention at room temperature, modification of the ordinary electrometric pH method is necessary. This modified method, as used herein, is as follows:

A sample of the pressurized salt solution is dissolved in a methanol/water mixture of 75/25 ratio by volume to give 0.5 gram of salt per 100 grams of solution. Conventional pH procedures are used with a standard pH meter with glass and calomel electrodes in the solution. The solution is maintained at 25° C. and the meter standardized against a known pH buffer solution. Using the salt of dodecanedioic acid and PACM with this method, the equivalence point is found to be at pH 8.1 ± 0.05.

The PACM salts of this invention are readily polymerized to the corresponding polycarbonamides using conventional 66 nylon procedures, except that somewhat higher temperatures are required. U.S. Patents 2,130,947 and 2,163,584 describe such procedures. In general, the solutions will be heated to effect sufficient polycondensation, i.e., increase in molecular weight, that fibers can be drawn from a melt.

It is an ancillary finding of this invention that the homogeneous salt solutions can be subsequently treated to yield an enriched, or even essentially pure, salt of trans-trans PACM isomer. From the purified salt it is then possible, if desired, to obtain the trans-trans PACM isomer in highly purified form. It has been heretofore known that the isomer ratio in a mixture of PACM isomers can be adjusted as desired, for example by the process described in U.S. Patent 3,153,088. The process described therein, however, is not convenient for isolation of a single pure isomer but is primarily intended for altering the ratio of isomers in PACM. In contract thereto, the present invention makes it possible to isolate essentially pure trans-trans isomer.

The preparation of an enriched salt of the trans-trans PACM isomer and a $C_{12}$ to $C_{14}$ alkanedioic acid involves cooling to below 100° C., preferably in the range of about 25° C. to 100° C., a homogeneous, concentrated salt solution prepared in accordance with the invention. The salt of the trans-trans PACM isomer will readily precipitate leaving the salts of the other PACM isomers in solution. The precipitate is then isolated by filtration and washed. By treating the precipitate with an alkaline material, e.g., a strong base such as sodium hydroxide, the trans-trans PACM isomer is displaced and can be separated by extraction using a water-immiscible organic solvent such as butyl alcohol.

The following examples are provided to further illustrate the invention. Parts and percentages are by weight unless otherwise indicated.

EXAMPLE I

To a conventional evaporator vessel are added 327 pounds of deionized water (required for a 50% solution of salt to produce 300 pounds of polymer), and 171 pounds of dodecanedioic acid with agitation. The acid is a white crystalline solid with a melting point of about 130° C. Agitation is noted to be largely ineffective near the end of the addition, with the powdered acid merely floating on top of the slurry without mixing. The vessel is closed and purged 6 times to remove oxygen by pressurizing to 75 p.s.i.g. with nitrogen then bleeding to 5 p.s.i.g. The slurry is heated to about 140° C. prior to introduction of PACM. Molten PACM diamine, containing 70% of the trans-trans isomer, about 25% of the cis-trans isomer and about 5% of cis-cis isomer, is pumped by means of a constant displacement pump into the vessel for a period of time calculated to add 156.0 pounds thereof. The batch is agitated for 15 minutes at a temperature of 140° C. at autogeneous pressure (about 40 p.s.i.g.). A clear homogeneous solution of the corresponding nylon salt results.

A sample is removed and the pH of the salt determined in 0.5% solution in methanol:water, 75:25 by volume. The pH is found to be 8.23. The pH is adjusted to 8.26 by the introduction of an additional 0.48 pound of the diamine.

Following adjustment of the solution pH, the solution is concentrated to approximately 65% by evaporation and passed into an autoclave and polymerized in a manner similar to that described in Example IV.

The resulting polymer is cast and cut into flake. There are obtained 298 pounds of a high molecular weight polymer. Fibers can be melt-spun from the polymer by conventional techniques.

EXAMPLE II

The pressure-temperature-concentration relationships for 55% and 70% trans-trans isomers of PACM salt with dodecanedioic acid is determined by means of a glass pressure tube fitted with a pressure gauge, thermocouple, agitator and an external means of heating. The solubility is determined by charging stoichiometric amounts of the diacid and diamine into the tube with sufficient water to give the desired solution concentration. The tube is sealed and purged with nitrogen. The tube is then heated to 95° C. and excess pressure from expansion of water and the nitrogen atmosphere is bled off. The sealed tube is then heated further with continuous stirring until a homogeneous solution is achieved. Thereafter the temperature is decreased slowly and temperature and autogeneous pressure recorded at the instant when crystallization is first observed. The tube is then cooled and the contents analyzed for melting point, and carboxyl and amine ends to determine if any prepolymer is formed from decomposition of the resulting diammonium salt.

The particular temperatures and pressures, over a range of isomer compositions and salt concentrations, at which salt begins to crystallize from a homogeneous solution are shown in Table I.

TABLE I

| PACM isomer composition | Concentration, percent solids | Temperature of solution, °C. | Autogeneous pressure, p.s.i.g' |
|---|---|---|---|
| 55% trans-trans | 50 | 113 | 6.5 |
| 55% trans-trans | 60 | 116 | |
| 55% trans-trans | 70 | | 20 |
| 55% trans-trans | 80 | 136 | 22 |
| 70% trans-trans | 20 | 113 | |
| 70% trans-trans | 36 | 115 | 7 |
| 70% trans-trans | 50 | 118 | |
| 70% trans-trans | 60 | 123 | 17 |
| 70% trans-trans | 70 | 131 | 25 |
| 70% trans-trans | 80 | 138 | 28 |

As will be observed from the above, the higher the desired concentration of salt solution from a given PACM isomer content, the higher must be the minimum temperature and pressure employed. Although salt formation can be accomplished at concentrations up to 80%, this is generally undesirable because some prepolymer may be formed. Attempts to form a salt solution directly at 90% concentration tends to result in both prepolymer and polymer formation.

The extremely rapid rise in solution concentration with temperature is readily evident. The solubility of the salt is lower when the trans-trans PACM isomer content is at a high level but the rapid increase in solubility before the salt becomes unstable is still readily evident.

EXAMPLE III (a) Salt preparation

A 31.5% salt solution by weight is prepared by adding 50 grams dodecanedioic acid, 42 grams PACM, containing 70, 25, and 5% of the trans-trans, cis-trans and cis-cis isomers respectively, and 200 grams of water to a stainless steel tube which is sealed and heated to 150° C. for 45 minutes. The tube is cooled to a temperature of about 25° C. and the resulting precipitated salt recovered by filtration and drying.

(b) Preparation of pure trans-trans PACM isomer

Ten grams of a salt which has been similarly precipitated from solution on cooling is added to 30 ml. of distilled water containing 3.0 grams of sodium hydroxide and allowed to stand about 15 minutes to displace the PACM from the salt. The reaction mixture is extracted with three 15 ml. portions of butyl alcohol to take up the PACM. The combined butyl alcohol extracts are washed with a 15 ml. portion of water. Using a microdistillation apparatus, the butyl alcohol is stripped off using a steam bath and a vacuum of about 50 mm. Hg. The isolated PACM thus obtained has a melting range of 63–69° C., as determined on a heated block, and is thus concluded to be essentially pure trans-trans isomer. (The relationship between freezing point and isomer purity is described in U.S. Patent 2,494,563, referred to above.)

(c) Preparation cis-trans, cis-cis PACM isomeric mixture

The PACM dodecanedioic acid salt contained in the filtrate resulting from a salt preparation similar to part (a) above, is isolated by evaporation of the water. In 216 ml. of water containing 21.6 grams of sodium hydroxide there is dissolved 72 grams of this salt. The mixture is allowed to stand for 15 minutes. It is then extracted with three 100 ml. portions of butyl alcohol. The butyl alcohol solution is filtered to remove any precipitate and the residue washed with additional alcohol. The alcohol extracts are washed with approximately 100 ml. of water. The butyl alcohol is removed under vacuum at around 37° C. The residue is dissolved in diethyl ether and the solution dried with a mixture of anhydrous calcium sulfate and anhydrous sodium sulfate. The solution is filtered and the ether distilled off. The remaining PACM is distilled off under vacuum above 140° C. The resulting PACM is found to be composed essentially of cis-trans and cis-cis isomers. The salt preparation thus resulted in a very effective separation of the trans-trans PACM salt from the other two isomers.

EXAMPLE IV

An aqueous 55% solids salt solution, prepared as in Example I, is analyzed as in Example I and then adjusted to a pH of 8.08. The solution, 939 lbs., is concentrated in an evaporator to approximately 65% solids under a pressure of 40 p.s.i.g. over a period of 1 hour and 53 minutes, 142 lbs. H$_2$O being removed. The salt solution is then passed into an autoclave equipped with a helical ribbon type agitator. Polymerization is carried out by first raising the pressure from 100 to 300 p.s.i.g. and the temperature from about 140° C. to about 222° C. over a period of 37 minutes. The pressure is then held at 300 p.s.i.g. while the temperature is increased from about 222° C. to about 285° C. over a period of 98 minutes. The temperature is then increased from 285° C. to 310° C. while the pressure is decreased to atmospheric pressure over a period of 90 minutes. The polymerization proceeds further by heating at 310° C. for 90 minutes at essentially atmospheric pressure. Finally the polymer is put under a pressure of 100 p.s.i.g. of inert gas, then extruded, quenched, and cut into flake over a period of 19 minutes.

455 pounds of polymer are collected. The resulting polymer has a carboxyl end analysis of 94 (equivalents per million grams of polymer) and 38 amine ends. It has a relative viscosity of 40.8 in 50/50 98% formic acid/phenol by volume and a melting point of 282° C. Fibers can be melt spun from the polymer.

EXAMPLE V

Homogeneous solutions of the salt of PACM and dodecanedioic acid are formed following the general procedure of Example I except for variations in the technique of charging the components to the autoclave. The several techniques are as follows:

(a) The reactor is charged with acid, PACM and water below 100° C., closed and sufficient external heat applied to maintain the temperature to form a homogeneous solution.

(b) The reactor is charged with water and the solid acid, closed and heated under pressure to about 130° C., molten PACM at 90° C. is injected under pressure and the temperature maintained between about 140° C. to 160° C. The rate of PACM addition, the nature and size of the reactor vessel determines the amount of heating and/or cooling required to maintain the desired temperature. The larger the batch and the more rapid the addition, the greater will be the amount of cooling required to prevent overheating from the exothermic heat of reaction.

(c) The reactor is charged with water and heated under pressure to 140° C. Molten acid (135° C.) is added followed by molten PACM (90° C.).

(d) Water at 140° C., acid at 135° C. and PACM at 90° C. are simultaneously charged to a closed pressurized reactor equipped with a coil jacket for heating or cooling as necessary. Initially cooling will be required followed by heating as the reaction nears completion.

It will be observed that heating is not required to bring about reaction between the acid and the diamine but is employed primarily to facilitate their handling and mixing and to maintain the salt product in solution. When the reactants are heated to a molten condition to facilitate handling and mixing, the exothermic heat of reaction generates excess heat which must be removed by cooling. On a small scale this may be accomplished by normal heat dissipation from the reactor vessel; however, the poorer heat dissipation of large scale reactor vessels necessitates cooling by positive means.

Following the formation of the homogeneous salt solutions, the solutions are sampled, the pH measured, and the PACM/diacid adjusted to the desired level.

EXAMPLE VI

This example shows the effect of the presence of certain more readily soluble salts on the solubility of the more difficulty soluble salts of this invention. The general procedure of Example II is followed. Solutions are formed above about 110° to 115° C. and then the crystallization temperatures are determined.

The crystallization temperature is determined for a 26.8% by weight aqueous solution of the salt of 70% trans-trans PACM and dodecanedioic acid under superatmospheric pressure. The crystallization temperature is then determined for a solution containing the same percent of the PACM salt plus 3.2% by weight of the salt of hexamethylene diamine and adipic acid. This is then repeated using 3.2% of the salt of 70% trans-trans PACM and isophthalic acid in place of the latter salt. The two salt mixtures correspond to approximately a 9 to 1 ratio by weight of the PACM salt and the other salt giving a total salt concentration in each case of approximately 30 weight percent.

Crystallization temperature for the PACM salt alone is found to be about 114° C. In the presence of the salt of hexamethylene diamine and adipic acid at the specified concentrations, the crystallization temperature is found to average about 107.5° C. In the presence of the salt of PACM and isophthalic acid as described, the crystallization temperature is found to average 107° C.

The crystallization temperature of the solution containing the PACM salt of this invention is found to be lowered by the presence of a more soluble polyamide forming salt but temperatures in excess of 100° C. and superatmospheric pressure are still required to obtain concentrations of the desired degree.

EXAMPLE VII

In the appropriately pressurized system and following the general procedure of Example VI, the crystallization temperature of a 50% solution by weight of the salt of 70% trans-trans PACM and dodecanedioic acid in water is found to be 117° C. Replacing the water by a solvent system consisting of 10% methyl alcohol and 90% water by volume the crystallization temperature of the salt in 50% by weight concentration is now found to be 109° C.

What is claimed is:
1. Method which comprises providing under elevated temperature and pressure conditions a composition of water and an essentially equimolar mixture of bis(4-aminocyclohexyl)methane with at least 50% by weight thereof being the trans-trans isomer, and an aliphatic dicarboxylic acid of the formula

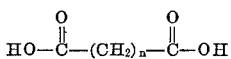

wherein $n$ is an integer of 10 to 12, inclusive, the weight of said mixture being at least about 20% by weight of the total composition, said temperature being about 110° C. to about 160° C. and said pressure being superatmospheric and at least autogenous pressure, and thereby forming a homogeneous aqueous salt solution, lowering the solution temperature to less than about 100° C. to precipitate an enriched salt of the acid with the trans-trans isomer of the diamine and separating the enriched salt so precipitated.

2. Method according to claim 1 which further includes the step of treating the enriched salt with a base to displace the trans-trans bis(4-aminocyclohexyl)methane and effecting separating thereof.

3. Method which comprises heating under pressure a composition of water and an essentially equimolar mixture of at least one organic diamine and at least one dicarboxylic acid, 90% to 100/ by weight of said diamine being bis(4-aminocyclohexyl)methane with at least 50% by weight thereof being the trans-trans isomer, and 90% to 100% by weight of said acid being an aliphatic dicarboxylic acid of the formula

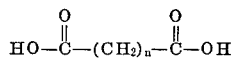

wherein $n$ is an integer of 10 to 12, inclusive, the weight of said mixture being at least about 20% by weight of the total composition, said temperature being about 110° C. to about 160° C., and said pressure being superatmospheric and at least autogenous pressure, and thereby forming a homogeneous, aqueous solution of the corresponding diammonium salt, adjusting the stoichiometry of the said solution to a predetermined level approximating an equimolar balance by adding to the formed solution at least one member of the group consisting of said bis(4-aminocyclohexyl)methane and said dicarboxylic acid, and heating the salt solution thus obtained to produce a polycarbonamide of fiber-forming molecular weight.

References Cited

UNITED STATES PATENTS

| | | | |
|---|---|---|---|
| 2,494,563 | 1/1950 | Kirk et al. | 260—78 X |
| 2,840,547 | 6/1958 | Stump | 260—78 |
| 2,606,924 | 8/1952 | Whitman | 260—78 X |
| 3,012,994 | 12/1961 | Bell et al. | 260—78 |

MAYER WEINBLATT, Primary Examiner

I. GLUCK, Assistant Examiner

U.S. Cl. X.R.

252—182; 260—29.2, 501.2